United States Patent
Souza

(10) Patent No.: US 9,057,473 B2
(45) Date of Patent: Jun. 16, 2015

(54) PIPE RESTRAINING REPAIR METHOD AND STRUCTURE FOR PIPING STRUCTURES USING COMPOSITES

(75) Inventor: James M. Souza, Houston, TX (US)

(73) Assignee: MILLIKEN & COMPANY, Spartanburg, SC (US)

( * ) Notice: Subject to any disclaimer, the term of this patent is extended or adjusted under 35 U.S.C. 154(b) by 232 days.

(21) Appl. No.: 13/587,690

(22) Filed: Aug. 16, 2012

(65) Prior Publication Data

US 2014/0048164 A1  Feb. 20, 2014

Related U.S. Application Data

(60) Provisional application No. 61/524,293, filed on Aug. 16, 2011.

(51) Int. Cl.
- F16L 55/18 (2006.01)
- F16L 55/172 (2006.01)
- F16L 58/10 (2006.01)

(52) U.S. Cl.
CPC ........... *F16L 55/172* (2013.01); *F16L 58/1054* (2013.01)

(58) Field of Classification Search
CPC ..... F16L 55/168; F16L 55/17; F16L 55/1705; F16L 55/175
USPC .............................................. 138/97, 99, 172
See application file for complete search history.

(56) References Cited

U.S. PATENT DOCUMENTS

| | | | | |
|---|---|---|---|---|
| 141,536 | A * | 8/1873 | Bellemere | 138/99 |
| 158,554 | A * | 1/1875 | Whitcomb | 138/99 |
| 647,996 | A * | 4/1900 | Smith | 164/92.1 |
| 3,457,963 | A * | 7/1969 | Hardwick | 138/172 |
| 3,860,043 | A * | 1/1975 | Kutnyak et al. | 138/153 |
| 4,559,974 | A * | 12/1985 | Fawley | 138/172 |
| 4,564,220 | A * | 1/1986 | Sills et al. | 285/236 |
| 5,814,387 | A * | 9/1998 | Orihara et al. | 428/63 |
| 6,219,991 | B1 * | 4/2001 | Salek-Nejad | 52/741.3 |
| 6,390,136 | B1 * | 5/2002 | Hutchins et al. | 138/109 |
| 6,435,218 | B2 * | 8/2002 | Hillenbrand et al. | 138/172 |
| 7,673,655 | B1 * | 3/2010 | Morton | 138/99 |
| 2006/0162797 | A1 * | 7/2006 | Boulet D'Auria et al. | 138/99 |
| 2008/0017263 | A1 * | 1/2008 | Robinson et al. | 138/99 |
| 2011/0284114 | A1 * | 11/2011 | Venero et al. | 138/99 |

\* cited by examiner

*Primary Examiner* — James Hook
(74) *Attorney, Agent, or Firm* — Cheryl J. Brickey

(57) ABSTRACT

Disclosed is a pipe reinforcement structure and method for repairing or reinforcing a pipe, pipeline or other tubular member containing one or more cracks or joints on its outer circumferential surface comprising the steps of: identifying a pipe repair zone along a longitudinal section of the outer surface of the tubular member where cracks or joints are located; installing one or more compression straps around the outer circumferential surface of the tubular member in the pipe repair zone, the one or more compression straps comprising outer edges and being secured in place with a buckle; optionally applying a high compression putty over the edges of the straps and buckles and in the cracks; applying a corrosion resistant coating over the installed compression straps and tubular member surface in the pipe repair zone; and applying a composite wrap material over the applied corrosion resistant coating in the pipe repair zone.

29 Claims, 7 Drawing Sheets

PIPE RESTRAINING REPAIR METHOD AND STRUCTURE FOR PIPING STRUCTURES USING COMPOSITES

CROSS-REFERENCE TO RELATED APPLICATIONS

The present application claims the benefit of the filing date of U.S. Provisional Application No. 61/524,293 filed Aug. 16, 2011. Said provisional application is incorporated herein by reference.

STATEMENT REGARDING FEDERALLY SPONSORED RESEARCH OR DEVELOPMENT

Not Applicable.

BACKGROUND OF THE INVENTION

1. Field of the Invention

The present invention is directed to a method for treating stress corrosion cracking in pipes, pipelines and other tubular members and a remediation structure for reinforcement repair of the same. More particularly, the present invention is directed to a pipe restraining repair method for treating stress corrosion cracking in pipes, pipelines and other tubular members using composites and to a pipe remediation structure.

2. Background/Description of Related Art

A wide variety of devices, apparatuses, systems and methods for repairing or reinforcing members such as pipe, pipelines, and structural members are known, including, but not limited to, the disclosures in U.S. Pat. Nos. 4,700,752; 5,348,801; 5,445,848; 5,632,307; 4,676,276; 6,276,401; 6,774,066; 7,387,138; 7,426,942; 7,367,362; 7,500,494; and 7,523,764—all incorporated fully herein for all purposes.

Structural members can be degraded, i.e. physically damaged or deteriorated due to cyclic loading fatigue enhanced by corrosion, erosion, temperature fluctuations, natural causes, third party causes, and time. Degraded members often require repair and/or reinforcement to preserve and/or restore their integrity and extend their useful life. The problems resulting from damage and deterioration affect piping systems which are subject to deterioration due to several factors, including sulfate reducing bacteria, galvanic action, and third party damage. The problem is not limited to piping systems. It also affects other structures such as piling, concrete columns, petroleum storage tanks, etc. which are subject to deterioration and damage.

Typically, cracks within the wall thickness of a piping structure, once initiated, will continue to propagate (both longitudinally along the length of the pipe or inwardly thru the wall thickness) until eventually the crack has gone thru the wall thickness and the pipe is unable to remain pressure containing. Stress corrosion cracking of pipes, pipelines and other tubular members is a problem that will continue until a failure state is experienced. Depending on the contents of the pipe and the pressure conditions of the pipe, such failure could result in serious damage to property and/or life. Once a crack is formed in a pipe, the sharp tips formed at the leading edges of the crack create a stress concentration and thereby cause continued propagation of the crack due to the stress or pressure cycles present in the pipe. Left unchecked, the crack will ultimately propagate through the wall of the pipe causing catastrophic failure. Currently, there does not exist a suitable method for treating stress corrosion cracking.

Currently, one of the methods to stop/repair crack propagation is to terminate the crack by drilling a hole through the pipe at the crack tips. Doing so eliminates the sharp tip and stress concentration thereby mitigating the propagation of the crack. The holes are then filled or patched. However, this method is unacceptable because it cannot be employed on pressurized pipe and it creates further potential for hazardous conditions in that creating such drilled holes in the pipe will cause temporary leakage of the contents of the pipe thereby creating environmental hazards during the repair when the pipe contains hazardous materials. Often with stress corrosion cracking there exists a plurality of cracks around the outer diameter of the pipe in the pipe repair zone; thus, the drilling technique is further unsuitable because it demands creation of a plurality of holes in the pipe in the pipe repair section.

Similarly, another current method for repairing stress corrosion in piping is to terminate the crack by grinding the cracked area while still having sufficient remaining wall thickness to make a secondary repair with either a welded split sleeve or a composite system. However, grinding the crack removes wall thickness which can weaken a pipe.

Another existing method for treating stress corrosion cracking in pipe includes placing the damaged pipe section (crack) in compression using mechanical compression devices. These methods typically employ very heavy metal clamps using a mechanical advantage of bolts to provide the compressive force. The compressive force prevents pipe movement (the opening and closing of the crack) during pipe pressure cycles thereby preventing further propagation of the crack. These methods are very expensive creating unfavorable economic and logistical repair conditions.

Yet another, but still unsatisfactory repair option, is to cut out (remove) the damaged section of pipe and splice (replace) in a new section. This creates a requirement for shutting down all flow through the pipe, a condition that could have severe economic impact (in shutting down the processes using the pipe) as well as environmental impact in dealing with the contents of the pipe once the damaged section is removed.

Older methods of repairing damaged pipelines comprise the replacement of the damaged or defective pipe section with new pipe or the installation of a metal sleeve over the damaged or defective area. Depressurizing the pipe or putting the pipe out of service while the pipe replacement is performed is often required for these known pipe repair methods. This procedure can become costly and inconvenient for the pipeline owner as well as the general public.

Also, Pipe Wrap, L.L.C. (Houston, Tex.) provides existing "Leak Stop™" methods for patching a leaking pipe by bonding a gasket material to the underside of a cured fiberglass material to create a patch, and then clamping this patch over the leak using banding devices known in the art. An epoxy putty is then spread over the entire repair zone, a corrosion coating/primer/adhesive is applied to the repair zone and a low tensile strength (4,900 psi) pipe wrap material is then wrapped over the setting epoxy before the epoxy is fully cured. The patch serves to provide a seal gasket over the hole(s) in the pipe (pipe wall loss damage is caused by presence of the holes) to stop the leaking, but not strengthen the pipe, and also serves to distribute the compressive load applied by the bands so as to prevent the damaged pipe walls from collapsing. However, this method is not suitable for addressing and arresting stress corrosion cracking, nor can it be used with temperatures exceeding 300° F., cryogenic temperatures or pipe pressures exceeding 150 psi owing to the limitations of the gasket seal. Further, the bands cannot be tensioned to their upper limits as doing so would collapse the damaged pipe.

Advances in composite materials and methods in the past two decades have introduced composites as a more widely accepted repair method for piping and infrastructure rehabilitation. Composites have offered owners of pipelines a cost-effective alternative to the disruption of service caused by pipe replacement or steel sleeves because composite repairs can be applied to the damaged areas while the pipeline is still in operation.

With the discovery of nanoparticles, it has been scientifically shown under laboratory conditions that the physical properties of a matrix and/or composite material such as tensile strength, tensile modulus, thermal and electrical conductivity, toughness, durability, etc., are enhanced with the incorporation of nanoparticles such as but not limited to nanotubes, graphene, nanofibers, bucky balls, nano clays, etc. (collectively "nanoparticles"). For example, it is known in the art that in the laboratory, epoxies have been impregnated with nanoparticles to form a hardened material. A matrix, in this sense, is generally understood to be defined as a pre-cured material, liquid or molten state that may include for example, but is not limited to, polyester resin, vinyl ester resin, epoxy resin, polyethylene, polypropylene, nylon, rubber, and the like. The composite material may generally be defined as any material that incorporates a fiber or aggregate that increases the resultant material's "load carrying" capability.

Known pipe repair and reinforcement systems include a fabric impregnated with a moisture-curing polyurethane polymer system or a fabric impregnated with a resin polymer in the field during installation of the product or a cured preform that is bonded with an adhesive as it is wrapped around a member. These products provide reasonable performance and service life. However, there is a need for improved performance especially in the area of extended fatigue/service life.

Permanence of a Fiber Reinforced Polymer, "FRP" composite repair is a requirement for pipeline repair methods under current DOT regulations (49 CFR §§192, 195; incorporated fully herein). The question of permanence of some FRP composite repairs has become of great concern to pipeline owners due to delaminations due to fatigue of some composite systems.

Consequently, these failed FRP's have provided questionable permanent repairs. DOT has ruled that FRP repairs are temporary unless the pipe is repaired by a method that reliable engineering tests and analyses show permanently restores the serviceability of the pipe.

As such, there remains an existing need to provide an acceptable method for repairing corrosion stress cracking in pipes, pipelines and other tubular members, and a suitable reparation or remediation structure.

BRIEF SUMMARY OF INVENTION

In accordance with the present invention, a repair method is disclosed for use in mitigating a crack within the wall thickness of a piping structure and to restore or extend the service life of the piping structure. Additionally, this method allows the creation of in-situ traps for composite materials thus inhibiting the lateral movement of the repair zone.

In one embodiment, the repair method is comprised of four (4) primary steps and may further comprise of an optional fifth (5th) step:

1) Compression straps with retaining clamps are wrapped around the entire pipe in on or more convolutions (or number of wraps) within the pipe repair zone. The straps are positioned to create both the compressive restraining force and the termination for the longitudinal growth of the crack. Additionally, the compressive restraining force prevents the lateral movement of the repair zone by enabling the full utilization of the composite properties of the wrap by creating mechanical stops (i.e., the straps and strap buckles) for the composite.

1A) Optional corrosion barrier or primer material may be placed between the pipe surface and the compression straps.

2) A high compressive load transfer filler (putty or paste form) is applied around any sharp edges of the straps or strap clamps/buckles. This will create a load transfer path to the composite material.

3) A pipe coating is applied to protect the prepared pipe surface from corrosion due to moisture ingress.

4) A composite wrapping material consisting of a plurality of convolutions (or number if wraps) that are circumferentially wrapped around the pipe repair zone, is applied thus providing a load carrying component of the system.

The materials for the present method can be provided separately or as part of a kit.

In another embodiment of the present invention there is disclosed a method for repairing or reinforcing a pipe, pipeline or other tubular member, the tubular member having an outer substantially circumferential surface and an outer wall having a wall strength, the tubular member containing one or more cracks on its outer circumferential surface, the one or more cracks comprising opposed leading edges and a crevice therebetween extending into the outer wall, the method comprising the following steps: identifying a pipe repair zone along a longitudinal section of the outer surface of the tubular member where one or more of the one or more cracks are located; installing one or more compression straps around the outer circumferential surface of the tubular member in the pipe repair zone, the one or more compression straps comprising outer edges and being secured in place with a buckle; applying a corrosion resistant coating over the installed compression straps and tubular member surface in the pipe repair zone; and applying a composite wrap material over the applied corrosion resistant coating in the pipe repair zone.

If desired, this method may further comprise the initial step of preparing the surface of the tubular member in the pipe repair zone by one or more of the following surface preparation techniques: high-pressure water jetting (with or without abrasives), dry abrasive blast, disk grinding, needle guns, wire wheel, sanding, application of a primer, or application of a corrosion resistant layer.

In one embodiment, at least one compressive strap is installed directly over at least one of the one or more cracks. In another, at least one of the one or more compression straps is located over the crevice of one of the one or more cracks.

The pipe repair zone may extend longitudinally beyond the opposed leading edges of the one or more cracks. In one embodiment, at least three compression straps are installed in the pipe repair zone; a first compression strap being installed over the crevice of one of the one or more cracks; a second compression strap being installed proximate to one of the two opposed leading edges of said crack, but not over said crack; and a third compression strap being installed proximate to the other of the two opposed leading edges of said crack, but not over said crack.

The compression straps may be made of a material having a yield strength matched to the wall strength of the tubular member. In one embodiment, the one or more compression straps are installed and tightened to their yield strength.

The one or more compression straps and buckles may be made of a material selected from the group consisting of: metals, stainless steel, 201 SS, 304 SS, 316 SS, 317L SS, alloys, galvanized carbon steel (including plastic coated), aramide fiber, such as Kevlar® fiber, nylon, polyester, carbon fibers, fiberglass, composite materials, nano-enhanced materials, and combinations thereof.

In one embodiment, the one or more compression straps and buckles are made of 201 SS having an average yield strength of between about 1500 lbs. and about 2250 lbs.

If desired, the method could further comprise the step of applying a high compressive strength, curable putty or paste material around the edges of the one or more compressive straps, and around the buckles after the step of installing the one or more compression straps, and optionally, in and around the crevice of the one or more cracks. The putty or paste material ideally has a compressive strength of greater than about 6000 psi. In one embodiment, the putty or paste material preferably has a compressive strength of between about 10,000 psi to about 20,000 psi.

The one or more compressive straps may be installed in a double wound wrapped fashion.

In practice this method, in one embodiment, at least one of the one or more compression straps is located over the crevice of one of the one or more cracks and the method further comprises the step of tightening said one or more compression strap to apply a compressive force sufficient to cause said crevice of said crack to close in whole or in part.

The composite wrap material may comprise a material selected from the group consisting of carbon fiber material, aramide fiber, fiberglass, nano-enhanced fibers, wound wire, polyester, nylon, and other materials preferably having tensile strength of at least 30,000 psi, and combinations thereof and the like.

The materials required for practicing the method and creating the reinforcement structure could be provided as a kit containing the one or more compression straps and buckles, the corrosion coating material, the composite wrap material and a high compressive strength, curable putty or paste material.

In another aspect of the present invention there is disclosed a method for reinforcing one or more joints (such as welded joints or other joints) of a tubular member, the tubular member having an outer substantially circumferential surface, the method comprising the following steps: identifying a pipe reinforcement zone along a longitudinal section of the outer surface of the tubular member where one or more of the joints are located; installing one or more compression straps around the outer circumferential surface of the tubular member in the pipe reinforcement zone, the one or more compression straps comprising outer edges and being secured in place with a buckle; applying a corrosion resistant coating over the installed compression straps and tubular member surface in the pipe reinforcement zone; and applying a composite wrap material over the applied corrosion resistant coating in the pipe reinforcement zone.

In this method it may be advantageous to include the further step of applying a high compressive strength, curable putty or paste material around the edges of the one or more compressive straps, and around the buckles after the step of installing the one or more compression straps.

In another embodiment of the present invention, there is described a reinforcement for a pipe, pipeline or other tubular member, the pipe having an outer substantially circumferential surface and an outer wall having a wall strength, the pipe containing one or more joints and/or cracks on its outer circumferential surface, the one or more cracks comprising opposed leading edges and a crevice therebetween extending into the outer wall, the pipe also defining one or more pipe reinforcement zones along one or more longitudinal sections of the outer surface of the pipe where one or more of the one or more joints and/or one or more cracks are located. In this embodiment, the pipe reinforcement comprises: one or more compression straps installed directly around the outer circumferential surface of the pipe in the one or more pipe reinforcement zones, the one or more compression straps comprising inner surfaces compressively contacting the pipe outer surface, outer edges and being secured in place with a buckle to a desired compressive tension; a corrosion resistant coating applied over the installed compression straps and pipe surface in the one or more pipe reinforcement zones; and a high strength composite wrap material wrapped around the applied corrosion resistant coating in the one or more pipe reinforcement zones.

In another embodiment, the pipe reinforcement further comprises a high compressive strength, curable putty or paste material applied around the edges of the one or more installed compressive straps, and around the buckles after the one or more compression straps are installed, and optionally, in and around the crevice of the one or more cracks.

In another embodiment, the pipe reinforcement further comprises a corrosion prevention layer between the pipe surface and the inner surfaces of the one or more compressive straps.

BRIEF DESCRIPTION OF THE DRAWINGS

In the accompanying drawings:

FIG. 1B is a cross section of FIG. 1A taken along lines 1B-1B to illustrate that the crack extends downward into the pipe wall, but not all the way through.

DETAILED DESCRIPTION OF THE INVENTION

It will be appreciated that the present invention may take many forms and embodiments. In the following description, some embodiments of the invention are described and numerous details are set forth to provide an understanding of the present invention. Those skilled in the art will appreciate, however, that the present invention may be practiced without those details and that numerous variations and modifications from the described embodiments may be possible. The following description is thus intended to illustrate and not to limit the present invention.

Figure 1A:
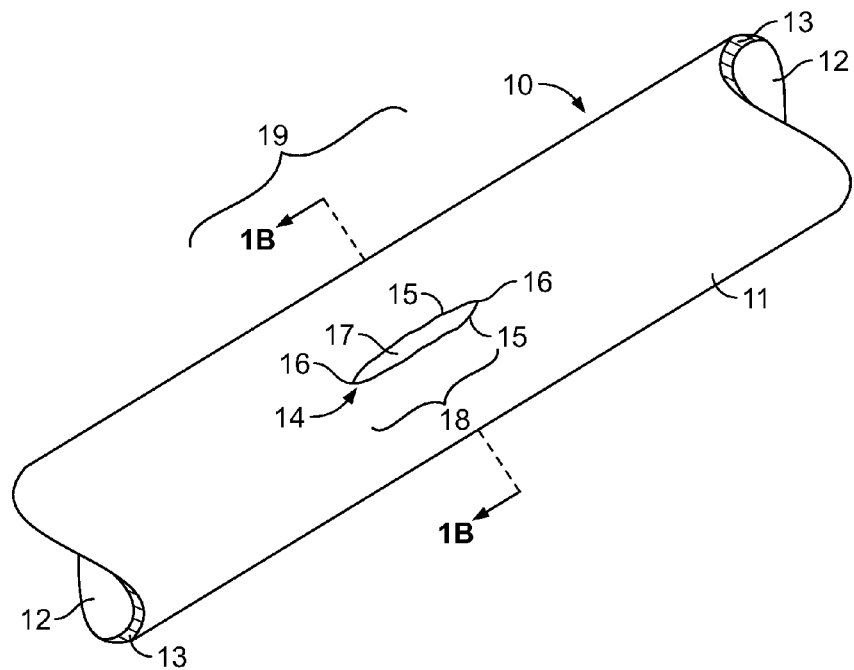
FIG. 1A is a section of a pipeline, a pipe, or other tubular member or structural piping support member exhibiting damage in the form of a crack, wherein the pipe restraining repair methodologies will be applied in a pipe repair zone. For purposes of illustration, only one crack is shown (there could be many) in the repair zone, and the crack is illustrated as penetrating to some depth into the wall of the pipe (but does not penetrate all the way through the pipe wall thickness).
Figure 1B:
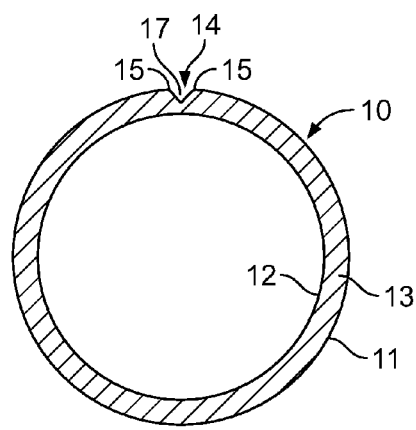

Referring to FIGS. 1A and 1B there is shown is a section of a pipeline, a pipe, or other tubular member or structural piping support member 10 having an exterior surface 11, and inside surface 12, and a wall thickness 13. The pipe 10 could be of any material subject to stress cracking, including, for example, metals and plastics. In this figure, the pipe is exhibiting damage in the form of one or more cracks 14 (only one crack is shown for illustration purposes), such as a crack caused by stress corrosion cracking (SCC) or other fatigue. A typical crack 14 may comprise opposed longitudinal edges 15 and opposed, sharp leading edges 16 forming a crevice 17 along the length 18 of the crack 14. The crevice 17 shown has a depth that is less than the overall pipe wall thickness 13. The crack's sharp leading edges 16 typically create areas of stress concentration as the crevice 17 continues to be subjected to stress. If these areas of stress concentration (or stress raises) are left unchecked, the continued exposure of the crack 14 to stress will permit the crack 14 to propagate in length and depth until such time that the crack depth (crevice 17) penetrates through the pipe wall thickness 13 causing catastrophic failure. As such, depending on the location of the crack(s) 14, the pipe restraining repair methodologies discussed herein will be applied in one or more pipe repair zones 19. Often with stress corrosion cracking there exists a plurality of cracks 14 around the outer circumference 11 of the pipe 10 in the pipe repair zone 19.

Although FIGS. 1A and 1B illustrate only a single crack 14 in a single pipe repair zone 19, it will be understood that there may exist numerous cracks formed around the circumference of the pipe within the same pipe repair zone, and there can exist more than one pipe repair zone on a given length of pipe. Thus, the pipe repair methods of the present disclosure are directed to not only repairing a single crack 14 in a single pipe repair zone 19, but also to repair multiple cracks 14 in a single pipe repair zone 19. The pipe repair methods of the present disclosure can also be separately employed in multiple pipe repair zones 19 along the length of pipe 10.

Figure 2A:
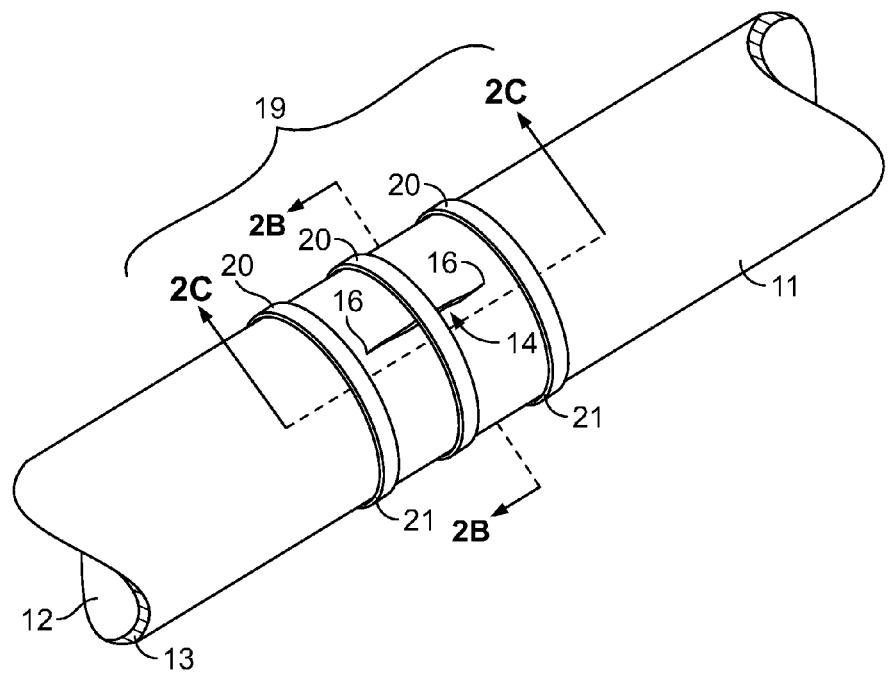
FIG. 2A illustrates the tubular member of FIG. 1 in an initial stage of repair according to the pipe restraining repair methodologies of the present invention, wherein a plurality of compression straps are installed around the pipe in the pipe repair zone. A corrosion barrier may, if desired, be installed between each strap and the pipe surface.
Figure 2B:
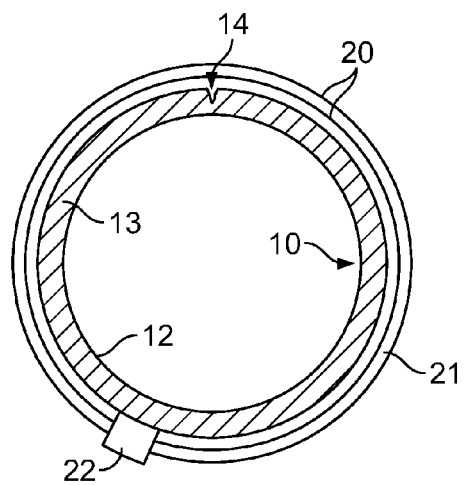
FIG. 2B is a transverse cross section of the tubular member of FIG. 2A taken along lines 2B-2B.
Figure 2C:
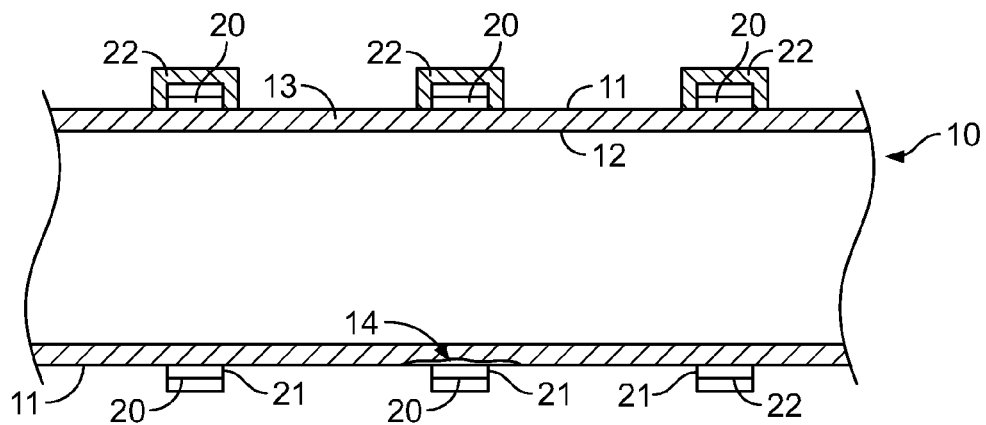
FIG. 2C is a longitudinal cross section of the tubular member of FIG. 2A taken along the lines 2C-2C.

FIGS. 2A, 2B and 2C illustrate the tubular member or pipe of FIG. 1 in an initial stage of repair according to the pipe restraining repair methodologies of the present invention. In this initial step, at least one compression strap 20 is, but preferably a plurality of compression straps are, installed around the pipe 10 in the pipe repair zone 19. As noted, although one compression strap could be used, it is preferable to employ more than one compression strap 20. As illustrated in FIGS. 2A and 2B, one strap 20 is installed over the approximate midpoint of the crack 14 (or widest part of the crevice 17). This centrally located strap 20 serves to provide compressive force across the crevice 17 to assist in arresting or restraining any stresses on the crevice to in turn reduce or eliminate the stress concentrations on the crack leading edges 16. Depending on the compressive forces applied, tightening the compression strap 20 that is located over the crevice 17 may actually result in the crevice 17 being closed in whole or in part. Additionally, in a preferred embodiment, compression straps 20 are also positioned around the pipe outer circumference away from the crack 14 beyond the leading points 16 of the crack 14 to serve as termination points for any further the longitudinal growth of the crack 14.

Prior to installing the strap(s) 20, the surface 11 of the pipe 10 is prepared (if desired) by high-pressure water jetting (with or without abrasives), dry abrasive blast, disk grinding, needle guns, wire wheel, sanding, or other surface preparation techniques known in the art, including, application of a primer.

In one embodiment, the compression straps 20 comprise stainless steel bands with stainless steel clamps or buckles. Preferably, each compression strap 20 is of a length greater than two-times the outer circumference of the pipe 10 to permit each strap 20 to be wrapped twice around the pipe before clamping (see FIG. 2B). The straps 20 may be constructed of any suitable thickness and width. In a preferred embodiment, the compression straps 20 must be capable of being tightened around the outer circumference of the pipe 10 up to a desired compressive force. In one preferred embodiment, the compression strap 20 is tightened until it reaches the yield strength of the strap 20. When steel band is tensioned up to its "yield strength" it has maximum holding force. Additional tensioning beyond the yield strength of the band 20 will stretch the band but not apply additional holding force. If tensioning and stretching continues the band will, ultimately, break. It is preferable to get tensioning consistently close to the band's "yield strength" without significantly stretching the band 20.

Ideally, the band 20 tensile strength is greater than 30 ksi (thousands of pounds per square inch) when the band 20 is used for steel pipe. In one preferred embodiment, the band 20 strength is 60 ksi when used for steel pipe. The band 20 strength can vary depending on the pipe 10 material (alloy, etc.) where the band strength is preferably matched to the ultimate strength of the pipe 10. Other band tensile strength specifications could be employed depending on the pipe material (e.g., PVC pipe, HDPE pipe, copper pipe, etc.) As will be understood by those of ordinary skill in the art having the benefit of the present disclosure, the compressive force used on each band 20 is designed to be within the limits of the pipe 10 to prevent collapse of the pipe 10 diameter when tightened. However, it is preferred to utilize the bands 20 to their utmost permitted compressive force (e.g., close to their yield strength) particularly since the later advantageous step of covering the bands with a composite wrapping material will provide added structural support to the bands to permit the bands to maintain a compressive force close to their yield strength. The point of maximum holding force of the band 20 may be too tight for some pipe and not tight enough for others; thus, it is recommended to test the type of pipe and banding before installing as the best measure to determine if the tightness is appropriate for the application.

In one example, the banding material was sourced from BAND-IT-IDEX, Inc. (Denver, Colo., www.band-it-idex.com), such as, for example, the Ultra-Lok® band and buckle system (a type of banding that can be doubled wrapped for additional strength (radial compression)). The Ultra-Lok® band system employs bands that are made out of, e.g., 201SS ¼ Hard. The band width of this product typically is ½ inch or ¾ inch. The average breaking strength of the 201 SS band is 1500 lbs. for the ½ width (0.030 inch thickness) band, and 2250 lbs. for the ¾ inch (0.030 inch thickness) band. The stainless steel Band-It brand of banding and clamping can be purchased in bulk rolls that can be custom cut to eliminate waste, or can be provided in precut lengths. Other banding materials are also available, such as, stainless steel, 304 SS, 316SS, 317L SS, alloys, galvanized carbon steel, and the like. As is known in the art, the banding is secured with various types of buckles, such as the Ultra-Lok® brand buckle, the Band-It® brand clip style buckles, Ear-Lokt Buckles, and Scru-Lokt Buckles, but preferably a permanent buckle.

An Ultra-Lok® banding tool (BAND-IT-IDEX, Inc.) or similar banding tool can be employed to install the band 20 around the pipe 10 and to secure it in place with the buckle 22. This (or similar) banding tool can provide the desired force/tension on the band (e.g., over 2,400 lbs. of force) and cut off the tail of the clamp being formed. Installation of band clamps is well known in the art. For example, according to Band-It, a typical double wrap band installation procedure (annotated to refer to the application in the present invention rather than to Band-It's generic example) would include the following:

1. Break off an Ultra-Lok® Free-End tie from the roll. Slide the buckle 22 onto band 20 with indented arrows (appearing on band and buckle, not shown) pointing in same direction and same side up. Slide buckle 22 all the way onto band 20 until it comes to a stop between the two buckle dimples at opposite end of the band 22 (in this embodiment, the pre-formed tie, or band has dimples at one end, not shown).

2. Wrap band 20 around the pipe 10 in the location to be clamped. Insert the band 20 through buckle 22 once for single-wrap or twice for double-wrap. Double-wrapped clamps have more than 3 times the loop-tensile strength.

3. If desired, a clamp may be preformed in the same fashion as step 2, or a preformed clamp may be used in place of a Free-End clamp. However, it is envisioned that most pipe repair applications will not have an open-ended pipe section to permit use of a preformed clamp, therefore, a Free-End clamp will most likely be employed.

4. Position the band on the pipe to be clamped. Pull the wrapped tie band 20 hand-tight. Slightly bend the tail up to keep the clamp 22 in place, 5. Actuate Ultra-Lok® Drill until Tension Block is all the way forward against the tool body. Set Drill to clock-wise rotation. With cut-off handle down, insert clamp tail into tool head slot. Actuate Drill until Drill's built-in clutch disengages. If Tension Block comes near its end of travel, release actuator switch and reverse Drill to pull more on clamp tail. Excessive use of disengaging Drill Clutch indicated by a loud ratcheting sound leads to premature wear of tension screw.

6. Do not force the tool against the clamp; it may result in a folded clamp tail.

7. Pull the cut-off handle forward to cut tail off and form a lock, then return handle to the down position. Reverse drill and feed clamp tail out of tool.

8. Inspect buckle on completed clamp and tap down buckle shroud to complete clamp. Tool is ready for next clamp. If lock has slipped under the sheared surface of the buckle 22, remove clamp and install a new one at reduced tension by lowering the Drill Clutch torque setting. http://www.band-it-idex.com/en/Literature/Tool_Instructions/P08986.pdf Other band and buckle/fastener arrangements may be employed. Stainless steel bands are less susceptible to corrosion. However, other band materials could be employed, including, for example, aramide fiber, such as Kevlar® fiber, nylon, polyester, carbon fibers, fiberglass, other metals, such as carbon steel (preferably plastic coated), and the like.

The number of bands 20 used in the pipe repair zone 19 will depend primarily on the length 18 and severity of the crack(s) 14. The spacing between the bands typically will be between 4-6 inches, but this spacing will also depend on the severity of the crack 14, the length of the crack 14 and the number of cracks in the pipe repair zone 19. For example, with a severe crack 14 that has a deeper penetration (crevice 17) into the wall 13 of the pipe 10, it will be preferred to use more straps 20 over the crack(s). It is also preferred to place bands beyond, but in close proximity to the leading points 16 of the crack(s) 14, e.g., 1-2 inches beyond.

In one embodiment, the pipe repair zone 19 has a length equal to the length 18 of the crack 14 plus 8 inches, where the crack is 8 inches in length. In another embodiment, the pipe repair zone 19 has a length approximately equal to two times the length 18 of the crack 14 wherein the pipe repair zone 19 is centered over the crack(s) 14 and extends beyond the ends 16 of the crack 14 by a distance of approximately ½ the length 18 of the crack 14. The Figures illustrating the crack 14, crack length 18, and band 20 placement are merely illustrative and are not meant to be drawn to scale. Furthermore, the overall size of the bands (width and thickness) and structure of the buckle are not drawn to scale, but are depicted in a manner that is illustrative of their use and location (such bands and buckle structures being well known in the art). For example, the standard banding material is typically of a thickness of 0.030 inches, so for purposes of illustration, the bands are not drawn to scale, but instead are depicted as being enlarged.

Figure 2D:
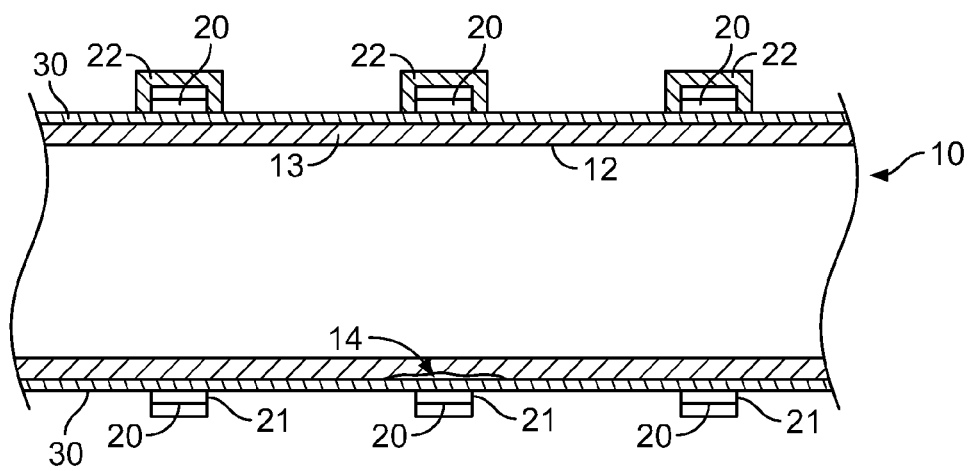
FIG. 2D is a longitudinal cross section of the tubular member of FIG. 2A, similar to that shown in FIG. 2C, illustrating the option of applying a layer of corrosion protective coating to the pipe surface prior to the installation of the compression straps.

Referring now to FIG. 2D, a corrosion barrier layer 30 may, if desired, be applied to the pipe surface 11 prior to installation of the bands 20 to prevent corrosion caused by e.g., metal-to-metal contact (e.g., galvanic scale existing between two contacting metals) where the pipe 10 and the bands 20 would be conducive to corrosion if left in contact with each other. This corrosion barrier 30 is applied generally to the pipe surface 11 (using known techniques, such as, spray-on, heated plural airless spray-on, brush-on, roller, wipe-on, trowel-on) in the pipe repair zone 19, and can comprise any suitable corrosion inhibitor coating known in the art. For example, Pipe Wrap, L.L.C. (Houston, Tex.) offers a corrosion barrier product under the PPR™ trademark. This PPR™ product comprises a proprietary blend of liquid epoxy polymer resin and aliphatic polyamine catalyst, which is able to displace water from wet surfaces in order to make a permanent bond. The formulation is solvent-free to ensure safety and maximum technical performance. Kevlar® (Dupont) fibers (or other a synthetic fibres, such as, e.g., those consisting of long-chain polyamides, having high tensile strength and temperate resistance) are incorporated into the PPR™ product for reinforcement and viscosity management and increased application rates—even under water. The PPR™ product as a cured film possess ideal physical properties, e.g., compressive strength (7,380 psi), tensile strength (6,000 psi), flexural strength (4,500 psi), abrasion resistance (34.0 mg/1,000 cycles) (CS17 wheels with 1,000 gram weights), and UV and chemical resistance. Ideally, the corrosion barrier product applied, such as the PPR™ product, does not require any length of time to dry so that the next step of the method is not delayed. Other corrosion barrier products are known in the art and can be suitably employed.

Figure 3A:
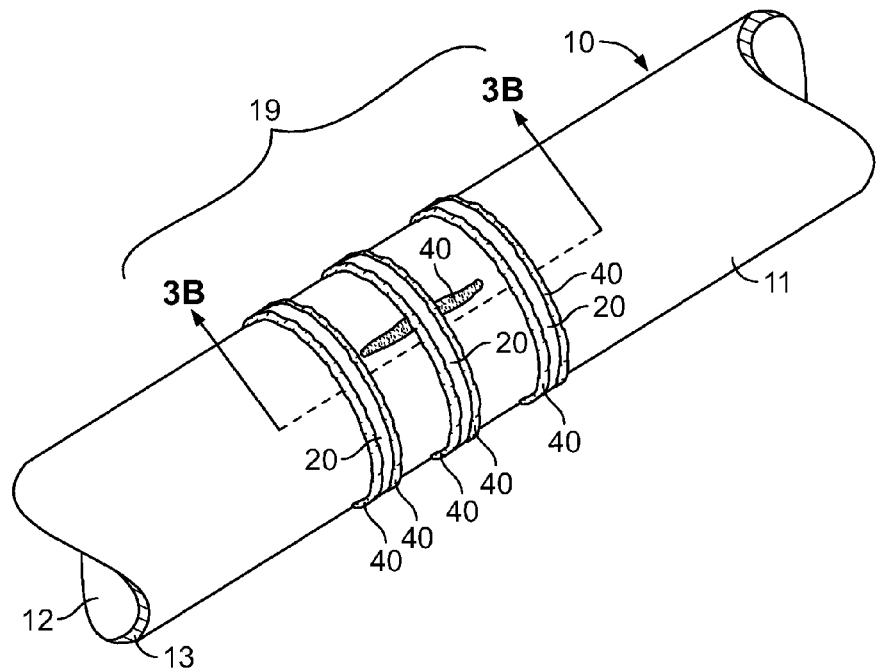
FIG. 3A illustrates the tubular member of FIG. 2A in a further stage of repair according to the pipe restraining repair methodologies of the present invention, wherein a load transfer putty or paste is applied around the plurality of compression straps and in and around the crack in the pipe repair zone.
Figure 3B:
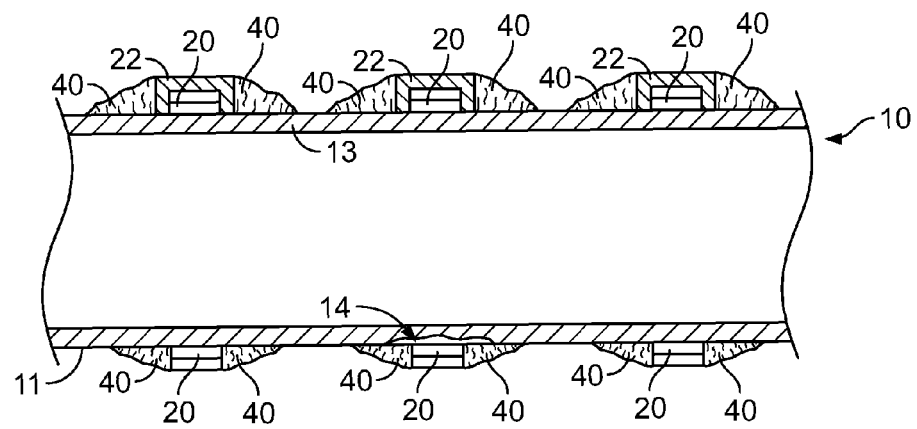
FIG. 3B is a longitudinal cross section of the tubular member of FIG. 3A taken along the lines 3B-3B.

Referring now to FIGS. 3A and 3B, there is illustrated the tubular member of FIG. 2A in a further, optional stage of repair according to the pipe restraining repair methodologies of the present invention, wherein a load transfer putty or paste 40 is applied around the edges 21 of the compression straps 20 and on and around the buckles 22 in the pipe repair zone 19. Because the square (sharp) edges 21 (see FIGS. 2A and 2B) of the bands 20, and the uneven edges and surfaces of the band clamps or buckles 22, create sharp points representing stress concentrations, a load transfer filler (putty or paste form) 40 is applied along such edges or over such surfaces to smooth out the interface. The load transfer putty or paste 40 may also be applied around and/or into the crack(s) 14. The load transfer putty or paste 40 comprises, e.g., putties or pastes preferably having compressive strengths of at least 6000 psi.

For example, Pipe Wrap, L.L.C. offers and sells compressive putty or paste materials (under the trademarks EP-400™ and EP-913™) comprising 11,000-14,000 psi compressive strengths. The EP400™ product comprises an epoxy putty available in a kneadable, reinforced epoxy putty stick that quickly cures (typically within 15-20 minutes) into a "steel hard" material possessing desirable characteristics: density (15.9 lb/gal), tensile strength (6,000 psi), compressive strength (18,000 psi), modulus of elasticity ($6\times10^5$ psi), hardness (85, Shore D), and shear strength (700 psi). The EP-913™ product comprises a proprietary blend of liquid epoxy polymer resin and aliphatic polyamine catalyst, which is able to displace water from wet surfaces in order to make a permanent bond. The formulation is solvent-free to ensure safety and maximum technical performance. Kevlar® (Dupont) fibers (or other a synthetic fibres, such as, e.g., those consisting of long-chain polyamides, having high tensile strength and temperate resistance) are incorporated into the EP-913™ product for reinforcement and viscosity management to assure reliable application even under adverse conditions. The EP913™ product as a cured film possess ideal physical properties, e.g., compressive strength (11,000 psi), tensile strength (6,000 psi), modulus of elasticity ($6\times10^5$ psi), hardness (85, Shore D), and shear strength (700 psi).

Other suitable putty and paste materials 40 include: metal-filled epoxy, ceramic-filled epoxy putty, nanoparticle-filled epoxies, polyester, vinyl ester, polyurethanes, phenolics, polyamides, nanoparticle-infused matrix materials and other putty materials known in the art that provide the desired compressive strengths (preferably high compressive strengths, preferably compressive strengths above about 6,000 psi, and also preferably compressive strengths between about 10,000 to about 20,000 psi). The load transfer putty or paste 40 creates a transition zone to enable the proper engagement of the later-applied composite wrap 60 that will be applied over the entire area of the pipe repair zone 19 while also minimizing any stress concentrations on the surface of the repair zone so that the underlying band 20 and band clamp 22 structures do not damage the later-applied composite wrap 60 (discussed below in connection with FIGS. 5A, 5B and 5C).

In another embodiment, the bands 20 could be manufactured with rounded edges (not shown), or the sharp edges 21 could be ground to a rounded contour to minimize the stress concentrations.

Figure 4A:
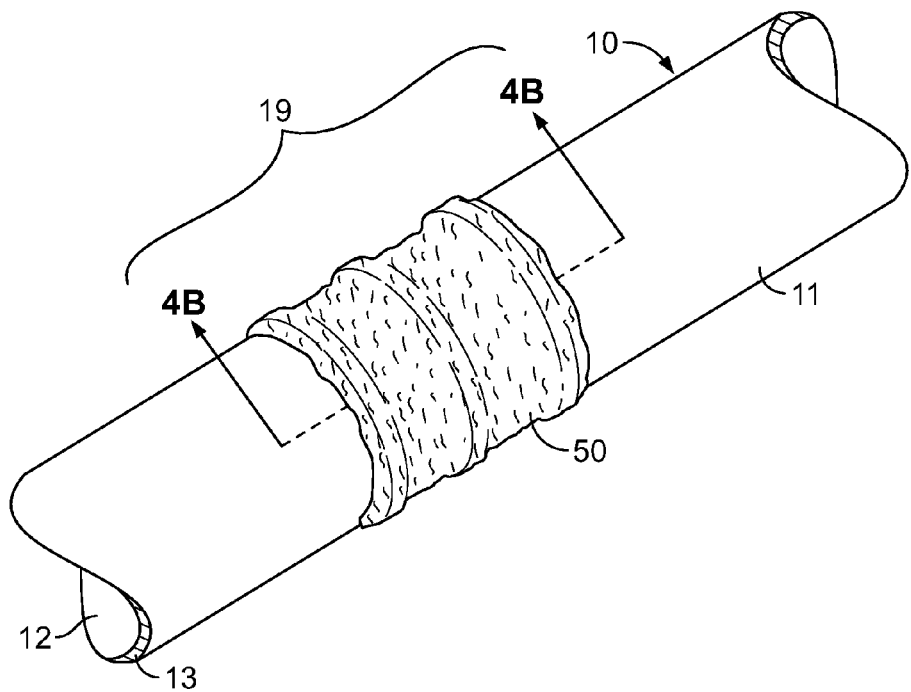
FIG. 4A illustrates the tubular member of FIG. 3A in a further stage of repair according to the pipe restraining repair methodologies of the present invention, wherein a corrosion resistant coating is applied over the plurality of compression straps, the crack, and the load transfer putty or paste in the pipe repair zone.
Figure 4B:
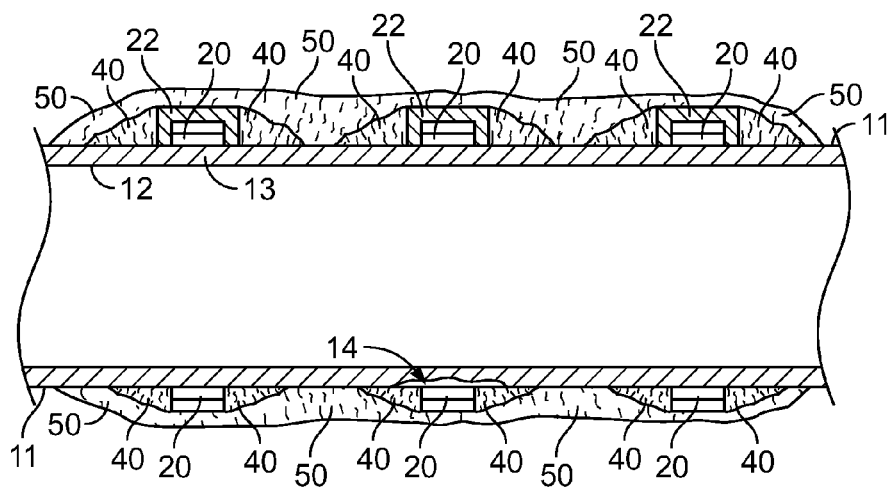
FIG. 4B is a longitudinal cross section of the tubular member of FIG. 4A taken along the lines 4B-4B.

Referring now to FIGS. 4A and 4B there is illustrated the tubular member 10 of FIG. 3A (or FIG. 2A) in a further stage of repair according to the pipe restraining repair methodologies of the present invention, wherein a corrosion resistant coating 50 is applied over the compression straps 20, buckles 22, the crack(s) 14, and the load transfer putty or paste 40 (if present) in the pipe repair zone 19. Once the bands have been put in place and any putty or paste applied, a corrosion resistant coating is applied over the pipe repair zone. This can be any corrosion resistant coating that can be sprayed, brushed or trowelled onto the surface (or applied using other known techniques). For example, the PPR™ corrosion barrier product from Pipe Wrap, L.L.C. may be employed to advantage. Ideally, the corrosion barrier product applied, such as the PPR™ product, does not require any length of time to dry so that the next step of the method is not delayed.

Figure 5A:
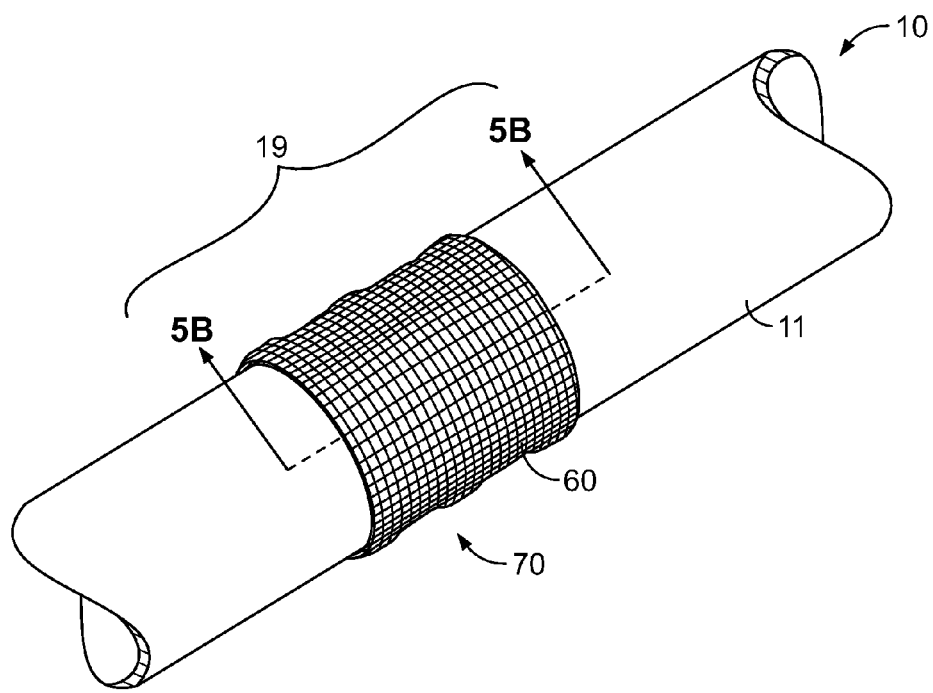
FIG. 5A illustrates the tubular member of FIG. 4A in a final stage of repair according to the pipe restraining repair methodologies of the present invention, wherein a composite wrapping material is applied over the corrosion resistant coating in the pipe repair zone to create a final pipe reinforcement, reparation or remediation structure.
Figure 5B:
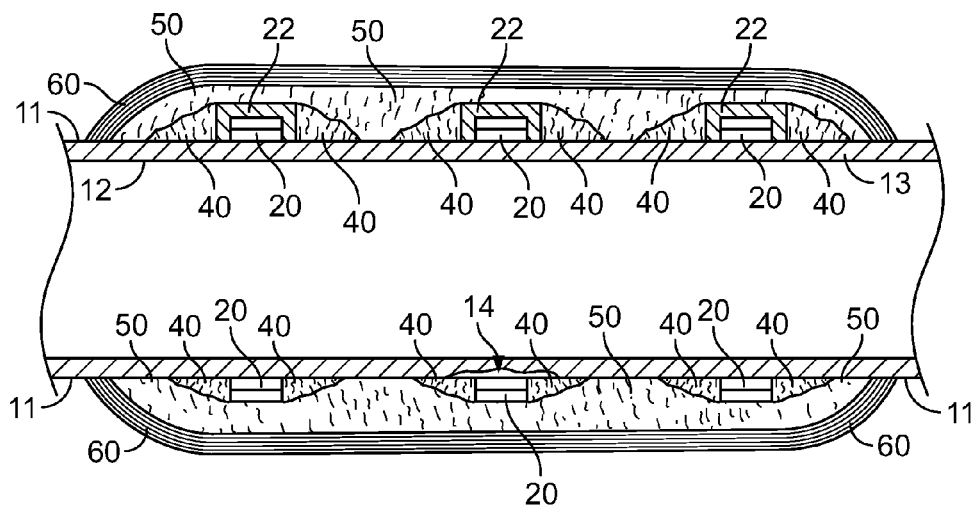
FIG. 5B is a longitudinal cross section of the tubular member of FIG. 5A taken along the lines 5B-5B.
Figure 5C:
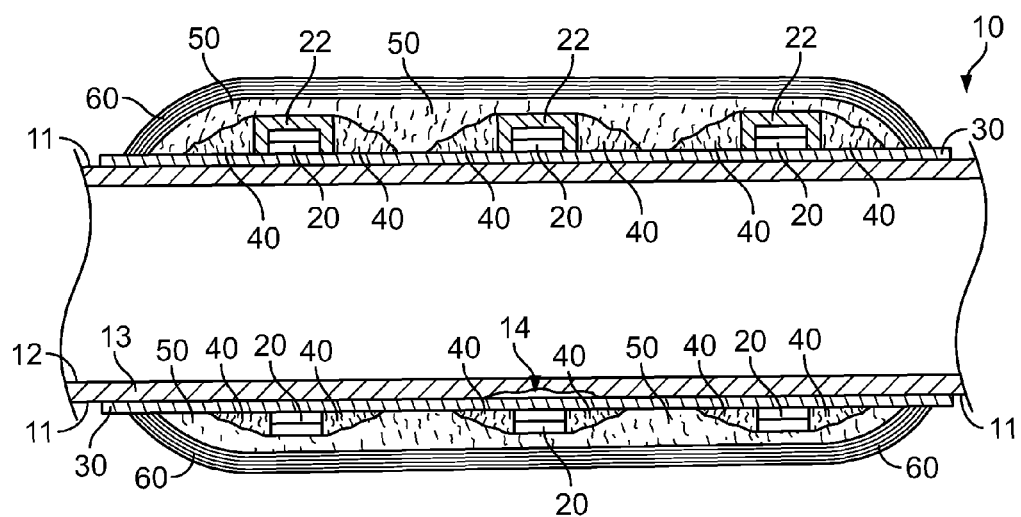
FIG. 5C is a longitudinal cross section of the tubular member of FIG. 5A, similar to that shown in FIG. 5B, illustrating the option of applying a layer of corrosion protective coating to the pipe surface prior to the installation of the compression straps.

FIG. 5A illustrates the tubular member 10 of FIG. 4A in a final stage of repair according to the pipe restraining repair methodologies of the present invention, wherein a composite wrapping material 60 is applied over the corrosion resistant coating 50 in the pipe repair zone 19 to create a completed pipe reinforcement, reparation or remediation structure 70. The underlying structure, such as the bands 20 and band buckle 22 coated with putty forming in-situ traps or stops for securing composite materials 60 thus inhibiting the lateral movement of the repair zone 19. In essence, layers of materials applied to the pipe repair zone, once applied, will hug the contours of the pipe around an compression band, or between adjacent compression bands, thereby locking the lateral movement of the applied materials in the pipe repair zone, and likewise restraining lateral movement of the pipe itself in the pipe repair zone.

The composite wrap material 60 is applied directly over the pipe repair zone 19. In a preferred embodiment, the composite wrap material comprises a carbon fiber material, but can also comprise, for example aramide fiber, fiberglass, wound wire, polyester, nylon, and other materials preferably having tensile strength of at least 30,000 psi. Pipe Wrap, L.L.C. offers a number of suitable composite wraps, such as, Atlas™ carbon fiber epoxy system, Formashield™ e-glass material epoxy system, A+ Wrap™ polyurethane e-glass impregnated fiberglass system, and nanoparticle-reinforced wraps.

For example, the A+ Wrap™ polyurethane e-glass impregnated fiberglass system (also referred to as "PWAP") provided by Pipe Wrap LLC (Houston, Tex., www.piperepair.net) comprises glass fiber reinforced fabric that is factory impregnated with durable, moisture cured polyurethane (MCU) resins. In another embodiment, the PWAP cloth is enhanced by having integrated therein uniformly dispersed nanoparticles. This original or nanoparticle-enhanced PWAP product is an exemplary wrap to use in the present methods for repairing or reinforcing pipe. To do so, the surface of the pipe repair zone 19 is prepared by applying an epoxy primer/undercoating 50 to the pipe repair zone as noted above. The PWAP or enhanced PWAP material 60 is then tightly wrapped over the primer coating 50 on the pipe repair zone 19. The wrapped layer 50 is then sprayed with water as a catalyst to react with the un-catalyzed resin, and the layering/watering steps are repeated until the area is covered. A final layer of a constrictor wrap is then applied to bind and tighten the wrapped area until cured. The water that is applied to the wrap during the application is the catalyst that causes the resin to react. Other suitable resin-impregnated fabrics employing a water-catalyzed epoxy may likewise be used.

Additionally, for example, Pipe Wrap LLC (Houston, Tex., www.piperepair.net) offers one pipe repair system, called PIPE WRAP® that employs an epoxy putty that is physically applied to plug the leak. After application of the putty, a fiber reinforced cloth tape, soaked in water, is wrapped around the leak area. The water activates the curing agent and the cloth holds the putty in place providing for a simple, pipe repair solution. This existing PIPE WRAP® system would not be employed in the present invention as it does not possess the requisite high tensile strength in its present form. However, a wrap such as this could be strengthened with the use of nanomaterials to provide the desired strength. For example, the putty of this existing PIPE WRAP® system could be impregnated with uniformly-dispersed nanoparticles to enhance the strength of the repair. Likewise, the fabric/cloth wrap layer could be strengthened with nanomaterials.

The present invention, therefore, provides in some, but not in necessarily all embodiments a fabric wrap for application on an area of the pipe repair zone, the fabric device having: at least one layer of fabric, the at least one layer of fabric having a first surface and a second surface spaced-apart from the first surface, the fabric made of composite material; nanomaterial bonded to at least one surface of the fabric; and a resin matrix on the fabric over the nanomaterial. Such methods may comprise one or some, in any possible combination, of the following: the at least one surface is both the first surface and the second surface with nanomaterial bonded to each surface; the at least one layer of fabric is a plurality of adjacent layers of fabric and at least one surface or both surfaces of each layer has nanomaterial thereon; the nanomaterial is one of (treated or untreated) nanotubes, nanofibers, nano whiskers, graphene, nanoclays, nanowire, nanoinclusions, and bucky paper; the resin matrix is one of thermosetting resin, epoxy resin, thermoset polymer, thermoplastic polymer, and polyurethane resin; and/or nanomaterial in the resin matrix for inhibiting or stopping crack propagation.

Any wrap system capable of achieving the desired strength could be employed.

In any method according to the present invention, the fabric as provided may be an amount (e.g., a piece or a roll) of fabric with resin already on the fabric (and not applied following drying). The fabric may, as described above, be wetted with the matrix, e.g. a two-part epoxy resin; or the fabric may have both parts of a two-part epoxy resin applied to it after which it is cooled or frozen to prevent resin curing. With the latter alternative, a previously-frozen device may be heated to "kick start" resin curing.

In addition to increasing the circumferential hoop strength of the pipe after treatment with the above method, it was also found that the longitudinal movement of the repaired zone was also restrained. As such, the pipe repair method of the present invention also may be employed to increase the strength of welded pipe joints (e.g., butt welded joints), particularly those joints that are exhibiting some degree of fatigue, as a method of preventing weld failure.

All references referred to herein are incorporated herein by reference. While the apparatus, systems and methods of this invention have been described in terms of preferred or illustrative embodiments, it will be apparent to those of skill in the art that variations may be applied to the process and system described herein without departing from the concept and scope of the invention. All such similar substitutes and modifications apparent to those skilled in the art are deemed to be within the scope and concept of the invention. Those skilled in the art will recognize that the method and apparatus of the present invention has many applications, and that the present invention is not limited to the representative examples disclosed herein. Moreover, the scope of the present invention covers conventionally known variations and modifications to the system components described herein, as would be known by those skilled in the art.

U.S. Patent References
 1. U.S. Pat. No. 4,676,276, Jun. 30, 1987 Fawley
 2. U.S. Pat. No. 4,700,752, Oct. 20, 1987 Fawley
 3. U.S. Pat. No. 5,348,801, Sep. 24, 1994 Venzi et al.
 4. U.S. Pat. No. 5,445,848, Aug. 29, 1995 Venzi et al.
 5. U.S. Pat. No. 5,632,307, May 24, 1997 Fawley et al.
 6. U.S. Pat. No. 5,877,110, Mar. 22, 1999 Synder et al.
 7. U.S. Pat. No. 5,965,470, Oct. 12, 1999 Bening et al.
 8. U.S. Pat. No. 6,203,814, Mar. 20, 2001 Fisher et al.
 9. U.S. Pat. No. 6,276,214, Aug. 21, 2001 Kimura et al.
 10. U.S. Pat. No. 6,276,401, Aug. 21, 2001 Wilson
 11. U.S. Pat. No. 6,284,832, Sep. 4, 2001 Foulger et al.
 12. U.S. Pat. No. 6,299,812, Oct. 9, 2001 Newman et al.
 13. U.S. Pat. No. 6,368,569, Apr. 9, 2002 Haddon et al.
 14. U.S. Pat. No. 6,417,265, Jul. 9, 2002 Foulger
 15. U.S. Pat. No. 6,569,937, May 27, 2003 Foulger et al.
 16. U.S. Pat. No. 6,682,677, Jan. 27, 2004 Lobovsky et al.
 17. U.S. Pat. No. 6,712,864, Mar. 30, 2004 Horiuchi et al.
 18. U.S. Pat. No. 6,723,299, Apr. 20, 2004 Chen et al.
 19. U.S. Pat. No. 6,774,066, Aug. 10, 2004 Souza et al.
 20. U.S. Pat. No. 6,783,702, Aug. 31, 2004 Niu et al.
 21. U.S. Pat. No. 6,783,746, Aug. 31, 2004 Zhang et al.
 22. U.S. Pat. No. 6,790,425, Sep. 14, 2004 Smalley et al.
 23. U.S. Pat. No. 6,790,790, Sep. 14, 2004 Lyons et al.
 24. U.S. Pat. No. 6,825,060, Nov. 30, 2004 Lyons et al.
 25. U.S. Pat. No. 6,866,891, Mar. 15, 2005 Liebau et al.
 26. U.S. Pat. No. 6,875,412, Apr. 5, 2005 Margrave et al.
 27. U.S. Pat. No. 6,905,667, Jun. 14, 2005 Chen et al.
 28. U.S. Pat. No. 6,908,261, Jun. 21, 2005 Hannay et al.
 29. U.S. Pat. No. 6,921,462, Jul. 26, 2005 Montgomery et al.
 30. U.S. Pat. No. 6,949,216 A Sep. 27, 2005 Brice et al.
 31. U.S. Pat. No. 7,093,664, Aug. 22, 2006 Todd et al.
 32. U.S. Pat. No. 7,094,367, Aug. 22, 2006 Harmon et al.
 33. U.S. Pat. No. 7,105,596, Sep. 12, 2006 Smalley et al.
 34. U.S. Pat. No. 7,122,461, Oct. 17, 2006 Dubin
 35. U.S. Pat. No. 7,125,533, Oct. 24, 2006 Khabashesku et al.
 36. U.S. Pat. No. 7,153,903, Dec. 26, 2006 Barraza et al.
 37. U.S. Pat. No. 7,367,362, May 6, 2008 Rice et al.
 38. U.S. Pat. No. 7,387,138, Jun. 17, 2008 Rice et al.
 39. U.S. Pat. No. 7,426,942, Sep. 23, 2008 Rice
 40. U.S. Pat. No. 7,479,516, Jan. 20, 2009 Chen et al.
 41. U.S. Pat. No. 7,500,494, Mar. 10, 2009 Robinson et al.
 42. U.S. Pat. No. 7,523,764, Apr. 28, 2009 Lepola et al.
 43. U.S. Pat. No. 7,601,421, Oct. 13, 2009 Khabashesku et al.

U.S. Patent Application Publications
 1. 20100090175, Apr. 15, 2010 Krishnamoorti et al.
 2. 20100098931, Apr. 22, 2010 Daniel et al.
 3. 20100113696, May 6, 2010 Khabashesku et al.
 4. 20100143701, Jun. 10, 2010 Zhu et al.

Non-Patent Literature Documents
 1. Berger, Michael, "Functionalization of carbon nanotubes is key to electrochemical nanotechnology devices", Nanowerk Spotlight, Nanowerk LLC, Sep. 17, 2008, accessed Feb. 23, 2012, http://www.nanowerk.com/spotlight/spotid=7288.php
 2. Yan, et al., "Rational Functionalization of Carbon Nanotubes Leading to Electrochemical Devices with Striking Applications", Advanced Materials, Vol. 20, Issue 15, pp. 2899-2906 (Aug. 4, 2008) (Abstract) accessed Feb. 23, 2012, http://onlinelibrary.wiley.com/doi/10.1002/adma.200800674/abstract;jsessionid=4929790B1B1D5535DF18AFC78999B127.d02t02
 3. Korneva, G., "Functionalization of Carbon Nanotubes", Thesis, Drexel University, May 2008, accessed Feb. 23, 2012, http://idea.library.drexel.edu/bitstream/1860/2797/1/Korneva_Guzeliya.pdf 4. Balasubramanian, K. and Burghard, M., "Chemically Functionalized Carbon Nanotubes", small, 2005, 1, No. 2, 180-192, available online at http://www.tinhoahoc.com/Nanotechnology/C-nanotube-Small02-2005.pdf
5. THOSTENSON. E. T.; Ll. W. Z.; WANG; D. Z. REN; Z. F.; CHOU, T. W.; "Carbon nanotube/carbon fiber hybrid multiscale composites", Journal of Applied Physics, Vol. 91, No. 9, pp. 6034-6037, May, 2002.
6. COOPER, CAROLE A.; COHEN, SIDNEY R.; BARBER, ASA H.; WAGNER, H. DANIEL; "Detachment of nanotubes from a polymer matrix", Applied Physics Letters, Vol. 81, No. 20, pp. 3873-3875, November, 2002.
7. BARBER, ASA H.; COHEN, SIDNEY R.; WAGNER, H. DANIEL; "Measurement of carbon nanotube-polymer interfacial strength", Applied Physics Letters, Vol. 82, No. 23, pp. 4140-4142, June, 2003.
8. SCHADLER, L. S.; GIANNARIS, S. C.; AJAYAN, P. M.; "Load transfer in carbon nanotube epoxy composites", Vol. 73, No. 26, pp. 3842-3844, December, 1998.
9. QIAN, D.; DICKEY, E. C.; ANDREWS, R.; RANTELL, T.; "Load transfer and deformation mechanisms in carbon nanotube-polystrene composites", Applied Physics Letters, Vol. 76, No. 20, pp. 2868-2870 May, 2000.
10. BEKYAROVA, E.; THOSTENSON, E. G.; YU, A; KIM, H.; GAO, J.; TANG, J.; HAHN, H. T.; CHOU, T. W.; ITKIS, M. E.; HADDON, R. C.; "Multiscale Carbon Nanotube-Carbon Fiber Reinforcement for Advanced Epoxy Composites"; American Chemical Society, Langmuir 2007, 23, 3970-3974.

I claim:

1. A method for repairing or reinforcing a pipe, pipeline or other tubular member, the tubular member having an outer substantially circumferential surface and an outer wall having a wall strength, the tubular member containing one or more cracks on its outer circumferential surface, the one or more cracks comprising opposed leading edges and a crevice therebetween extending into the outer wall, the method comprising the following steps:
   a. identifying a pipe repair zone along a longitudinal section of the outer surface of the tubular member where one or more of the one or more cracks are located;
   b. installing one or more compression straps around the outer circumferential surface of the tubular member in the pipe repair zone, the one or more compression straps comprising outer edges and being secured in place with a buckle;
   c. applying a corrosion resistant coating over the installed compression straps and tubular member surface in the pipe repair zone; and
   d. applying a composite wrap material over the applied corrosion resistant coating in the pipe repair zone.

2. The method of claim 1 further comprising the initial step of preparing the surface of the tubular member in the pipe repair zone by one or more of the following surface preparation techniques: high-pressure water jetting (with or without abrasives), dry abrasive blast, disk grinding, needle guns, wire wheel, sanding, application of a primer, or application of a corrosion resistant layer.

3. The method of claim 1 wherein at least one compressive strap is installed directly over at least one of the one or more cracks.

4. The method of claim 1 wherein at least one of the one or more compression straps is located over the crevice of one of the one or more cracks.

5. The method of claim 1 wherein the pipe repair zone extends longitudinally beyond the opposed leading edges of the one or more cracks.

6. The method of claim 5 wherein at least three compression straps are installed in the pipe repair zone; a first compression strap being installed over the crevice of one of the one or more cracks; a second compression strap being installed proximate to one of the two opposed leading edges of said crack, but not over said crack; and a third compression strap being installed proximate to the other of the two opposed leading edges of said crack, but not over said crack.

7. The method of claim 1 wherein the one or more compression straps are made of a material having a yield strength matched to the wall strength of the tubular member.

8. The method of claim 7 wherein the one or more compression straps are installed and tightened to their yield strength.

9. The method of claim 1 wherein the one or more compression straps and buckles are made of a material selected from the group consisting of: metals, stainless steel, 201 SS, 304 SS, 316 SS, 317L SS, alloys, galvanized carbon steel (including plastic coated), aramide fiber, such as Kevlar® fiber, nylon, polyester, carbon fibers, fiberglass, composite materials, nano-enhanced materials, and combinations thereof.

10. The method of claim 1 wherein the one or more compression straps and buckles are made of 201 SS having an average yield strength of between about 1500 lbs. and about 2250 lbs.

11. The method of claim 1 further comprising the step of applying a high compressive strength, curable putty or paste material around the edges of the one or more compressive straps, and around the buckles after the step of installing the one or more compression straps, and optionally, in and around the crevice of the one or more cracks.

12. The method of claim 11 wherein the putty or paste material has a compressive strength of greater than about 6000 psi.

13. The method of claim 11 wherein the putty or paste material has a compressive strength of between about 10,000 psi to about 20,000 psi.

14. The method of claim 1 wherein the one or more compressive straps are installed in a double wound wrapped fashion.

15. The method of claim 1 wherein at least one of the one or more compression straps is located over the crevice of one of the one or more cracks and further comprising the step of tightening said one or more compression strap to apply a compressive force sufficient to cause said crevice of said crack to close in whole or in part.

16. The method of claim 1 wherein the composite wrap material comprises a material selected from the group consisting of carbon fiber material, aramide fiber, fiberglass, nano-enhanced fibers, wound wire, polyester, nylon and other materials preferably having tensile strength of at least 30,000 psi, and combinations thereof.

17. The method of claim 1 further comprising the step of providing a kit containing the one or more compression straps and buckles, the corrosion coating material, the composite wrap material and a high compressive strength, curable putty or paste material.

18. A method for reinforcing one or more joints of a tubular member, the tubular member having an outer substantially circumferential surface, the method comprising the following steps:

a. identifying a pipe reinforcement zone along a longitudinal section of the outer surface of the tubular member where one or more of the joints are located;

b. installing one or more compression straps around the outer circumferential surface of the tubular member in the pipe reinforcement zone, the one or more compressions traps comprising outer edges and being secured in place with a buckle;

c. applying a corrosion resistant coating over the installed compression straps and tubular member surface in the pipe reinforcement zone; and d. applying a composite wrap material over the applied corrosion resistant coating in the pipe reinforcement zone.

19. The method of claim 18 further comprising the step of applying a high compressive strength, curable putty or paste material around the edges of the one or more compressive straps, and around the buckles after the step of installing the one or more compression straps.

20. The method of claim 19 wherein the one or more joints on the tubular member are welded joints.

21. A reinforcement for a pipe, pipeline or other tubular member, the pipe having an outer substantially circumferential surface and an outer wall having a wall strength, the pipe containing one or more joints and/or cracks on its outer circumferential surface, the one or more cracks comprising opposed leading edges and a crevice therebetween extending into the outer wall, the pipe also defining one or more pipe reinforcement zones along one or more longitudinal sections of the outer surface of the pipe where one or more of the one or more joints and/or one or more cracks are located, the pipe reinforcement comprising:

a. one or more compression straps installed directly around the outer circumferential surface of the pipe in the one or more pipe reinforcement zones, the one or more compression straps comprising inner surfaces compressively contacting the pipe outer surface, outer edges, and being secured in place with a buckle to a desired compressive tension;

b. a corrosion resistant coating applied over the installed compression straps and pipe surface in the one or more pipe reinforcement zones; and c. a high strength composite wrap material wrapped around the applied corrosion resistant coating in the one or more pipe reinforcement zones.

22. The pipe reinforcement of claim 21 wherein the one or more compression straps are made of a material having a yield strength matched to the wall strength of the pipe.

23. The pipe reinforcement of claim 21 wherein the one or more compression straps and buckles are made of a material selected from the group consisting of: metals, stainless steel, 201SS, 304 SS, 316 SS, 317L SS, alloys, galvanized carbon steel (including plastic coated), aramide fiber, such as Kevlar® fiber, nylon, polyester, carbon fibers, fiberglass, composite materials, nano-enhanced materials, and combinations thereof.

24. The pipe reinforcement of claim 21 wherein the one or more compressive straps are installed in a double wound wrapped fashion.

25. The pipe reinforcement of claim 21 further comprising a high compressive strength, curable putty or paste material applied around the edges of the one or more installed compressive straps, and around the buckles after the one or more compression straps are installed, and optionally, in and around the crevice of the one or more cracks.

26. The pipe reinforcement of claim 25 wherein the putty or paste material has a compressive strength of greater than about 6000 psi.

27. The pipe reinforcement of claim 25 wherein the putty or paste material has a compressive strength of between about 10,000 psi to about 20,000 psi.

28. The pipe reinforcement of claim 21 wherein the composite wrap material comprises a material selected from the group consisting of carbon fiber material, aramide fiber, fiberglass, nano-enhanced fibers, wound wire, polyester, nylon, and other materials preferably having tensile strength of at least 30,000 psi, and combinations thereof.

29. The pipe reinforcement of claim 21 further comprising a corrosion prevention layer between the pipe surface and the inner surfaces of the one or more compressive straps.

* * * * *